United States Patent
Perry et al.

(10) Patent No.: US 6,821,668 B1
(45) Date of Patent: Nov. 23, 2004

(54) FUEL PURGING OF CASCADED FUEL CELL STACK

(75) Inventors: Michael L. Perry, South Glastonbury, CT (US); Paul R. Margiott, South Windsor, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 427 days.

(21) Appl. No.: 09/921,809

(22) Filed: Aug. 3, 2001

(51) Int. Cl.$^7$ .......................... H01M 8/04; H01M 8/24
(52) U.S. Cl. ............... 429/38; 429/22; 429/32
(58) Field of Search .............. 429/13, 22, 23, 429/32, 34, 38

(56) References Cited

U.S. PATENT DOCUMENTS 5,985,474 A * 11/1999 Chen et al. .................. 429/17
6,251,534 B1 * 6/2001 McElroy ...................... 429/13
6,534,209 B1 * 3/2003 Hauer ......................... 429/13

* cited by examiner

Primary Examiner—Jonathan Crepeau
(74) Attorney, Agent, or Firm—M. P. Williams

(57) ABSTRACT

A fuel cell stack has a cascaded fuel flow field in which groups (10–12) of fuel cells (13, 13a) are arranged in flow-series, there being a fuel purge inlet valve (33) to provide fuel flow directly to two of the groups (11–12) downstream in the series, and a fuel purge outlet valve (36) to vent fuel flow directly from the first and second groups (10, 11) of fuel cells (13), whereby to avoid large pressure drop in the lowest group (12) of the series, to thereby facilitate quick purging of the fuel flow field. In other embodiments, rotary gates (40, 41) or sliding gates (56, 57) within manifolds cause fuel to flow into and out of all three groups directly during a purge.

5 Claims, 6 Drawing Sheets

FUEL PURGING OF CASCADED FUEL CELL STACK

TECHNICAL FIELD

This invention relates to rapid purging of fuel cell stack fuel flow fields and reactant manifolds, such as during startup and shutdown.

BACKGROUND ART

To achieve very high fuel utilizations, in excess of 95%, when operating a fuel cell stack on pure hydrogen, a cascade fuel flow field, illustrated in FIG. 1, comprises a plurality of groups 10–12 of fuel cells 13 arranged in flow-series relationship so that fuel from a source (not shown) passing through a fuel inlet valve 16 enters a fuel inlet manifold 17, flows through a first group 10 of fuel cells 13, then enters a first turn-around manifold 19, then flows through the second group 11 of fuel cells 13, thence through a second turn-around manifold 20 and through the third group 12 of fuel cells 13, to an exit manifold 22. For a typical 20 kilowatt fuel cell stack, the first group 10 has a large number of cells 13, which may be on the order of 95 or 105 cells, the second group 11 has a lesser number of cells 13, which may be on the order of 30–40 cells, and the third group 12 may have on the order of 5 to 15 cells. As is known, this assures that all of the cells get adequate hydrogen even with high hydrogen utilization, provided that the last group of cells 12 get adequate hydrogen.

In commonly owned, copending U.S. patent application Ser. No. 09/742,481, filed Dec. 20, 2000, now abandoned, it is shown that the more rapidly the fresh hydrogen-containing fuel flows through the anode flow field upon start-up, to displace the air therein, the quicker the hydrogen/air interface moves through the anode flow field, and the less time there is for the occurrence of corrosion of the platinum catalyst and catalyst support. In a similar fashion, it is known that the more quickly purge-air is passed through the anode upon shut-down, the less opportunity there is for hydrogen/oxygen interaction, which creates a safety hazard and may cause undesirably large voltage excursions in the cells, as described in commonly owned, copending U.S. patent application Ser. No. 09/742,497, filed Dec. 20, 2000, now abandoned.

With the cascade fuel flow field of the type described thus far with respect to FIG. 1, it is impossible to achieve rapid purging of the fuel flow fields since all of the purge gas must pass through a relatively small number of cells in the last cascade (the third group 12). This problem is a large contributor to the degradation of the first cascade (group 10) in fuel cell stacks employing cascade fuel flow fields, which in turn has impeded the adoption of the cascade design.

An alternative purge process may utilize inert gas, such as nitrogen, to purge the cell on shut-down; however, addition of an inert gas to a fuel cell system adds weight, cost and complexity which is unsuited for fuel cell powerplants used to power vehicles. Furthermore, the rapid deployment of hydrogen into the fuel flow fields upon startup, following an inert gas purge on shutdown, still remains a problem in a cascaded fuel flow field design.

DISCLOSURE OF INVENTION

Objects of the invention include: provision of a rapid purge in a fuel cell stack having cascade fuel flow fields; a fuel cell stack having the high-fuel-utilization advantage of a cascade fuel flow field without the purge problems heretofore associated therewith; an improved fuel cell stack utilizing cascade flow fields which has no unusual degradation of catalysts and other parts as a consequence of frequent shut-down and start-ups.

According to the present invention, a cascade reactant flow field of a fuel cell stack has at least one additional fuel inlet valve to provide inlet fuel directly to each cascade of the stack and at least one additional exhaust valve to remove fuel directly from each cascade of the stack.

The invention may be used not only for rapid deployment of fuel into the fuel flow field during start-up, but may also be used for a rapid purge of the fuel flow field with air during shut-down, provided the air is made available to the normal fuel inlet ports in an obvious fashion within the skill of the art.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
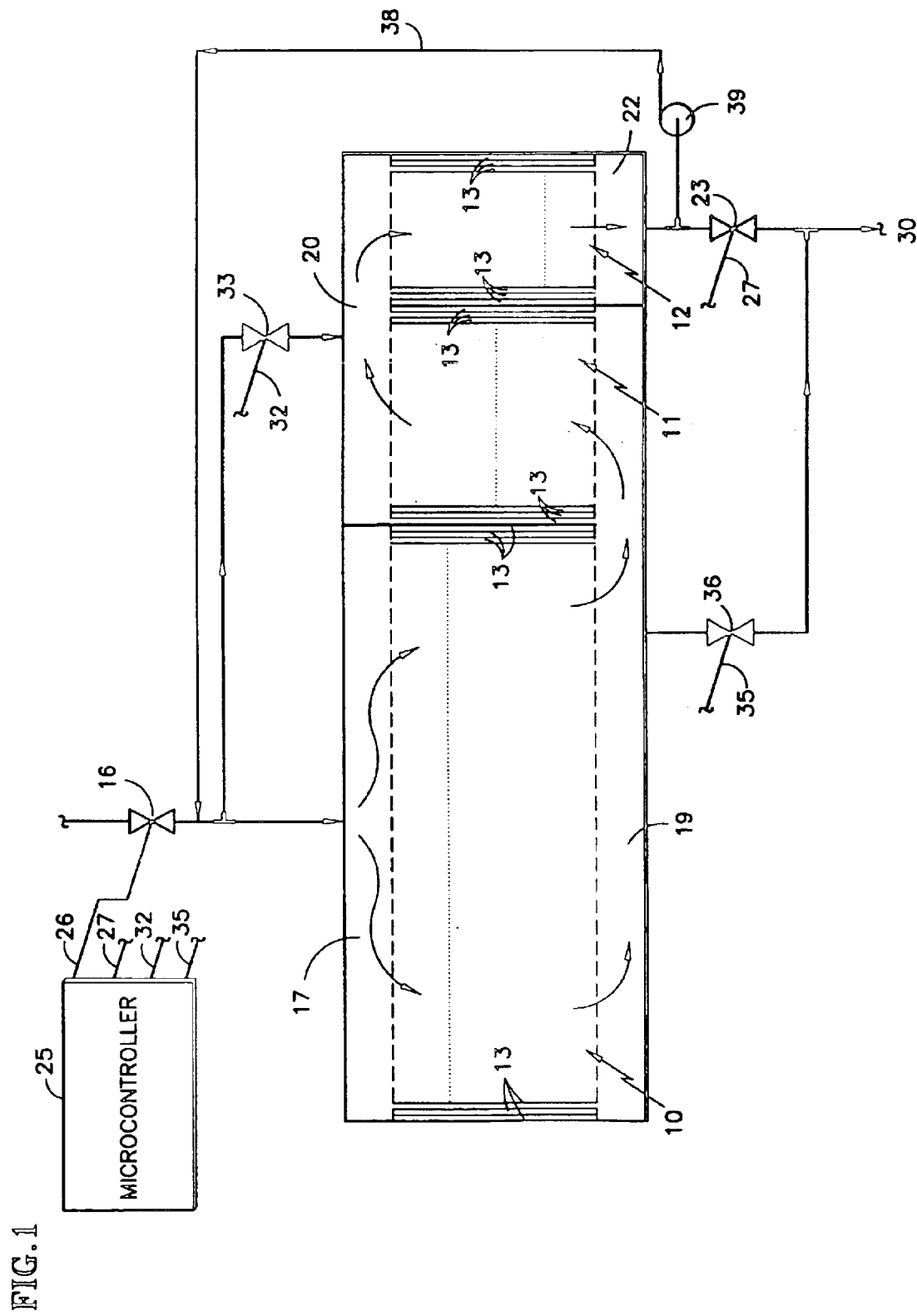
FIG. 1 is a schematic diagram of the fuel flow system of a fuel cell stack having a three-group cascade fuel flow field, with valves adjusted for normal fuel cell operation.

Referring to FIG. 1, during the production of electricity in normal fuel cell operation mode, a microcontroller 25 provides a signal on a line 26 to cause the fuel inlet valve 16 to be open, to provide fuel to the inlet manifold 17, the processor 25 also provides a signal on a line 27 to cause a normal fuel outlet valve 23 to be open. Under this condition, the fuel enters the inlet manifold 17, passes through the group 10 of cells 13, into the first turn-around manifold 19, through the group 11 of cells 13, through the second turn-around manifold 20, through the group 12 of cells 13, through the exit manifold 22, through the outlet valve 23, and to the exhaust 30.

Figure 2:
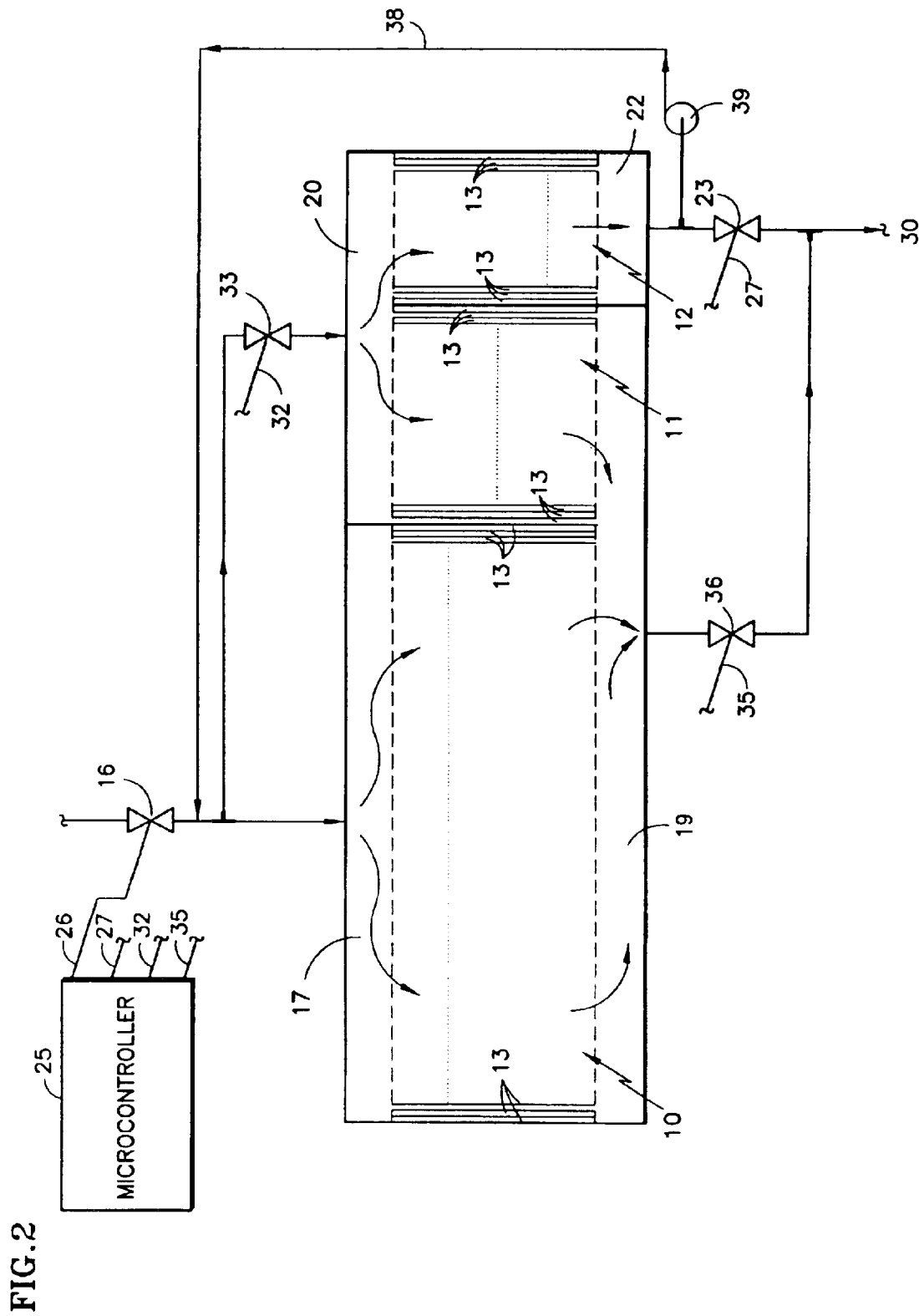
FIG. 2 is a schematic diagram of the fuel flow system of a fuel cell stack having a three-group cascade fuel flow field, with valves adjusted for a rapid purge of the fuel flow fields, in accordance with the invention.

Referring to FIG. 2, when it is desired to purge the fuel cells 13, the microcontroller 25 provides a signal on a line 32 to cause a purge inlet valve 33 to be open, and provides a signal on a line 35 to cause a purge outlet valve 36 to be open. Under these conditions, the flow is into both the inlet manifold 17 and into the second turn-around manifold 20; and the flow through the group 10 passes through the first turn-around 19 and through the valve 36 to the exhaust 30, whereas the flow from the valve 33 passes through the second turn-around 20 and through both groups 11 and 12; the flow through group 11 passes through the first turn-around 19 and the valve 36 to the exhaust 30, while the flow through the second group 12 passes through the exit manifold 22 and the normal exhaust valve 23 to the exhaust 30. Thus, the flow is directly into each cascade (each group 10–12), and the exhaust is directly from each cascade (each group 10–12). The fuel inlet means, valves 16 and 33, are thus settable in a first condition, valve 16 open and valve 33 closed, or in a second condition, both inlet valves open. Similarly, the fuel outlet means, valves 23 and 36 are settable in a first condition, valve 23 open and valve 36 closed, or in a second condition, both outlet valves open.

The fuel cell stack of the invention may include a recycle loop 38 driven by a pump 39, all in a conventional fashion; however, the use of a recycle loop is optional.

Figure 3:
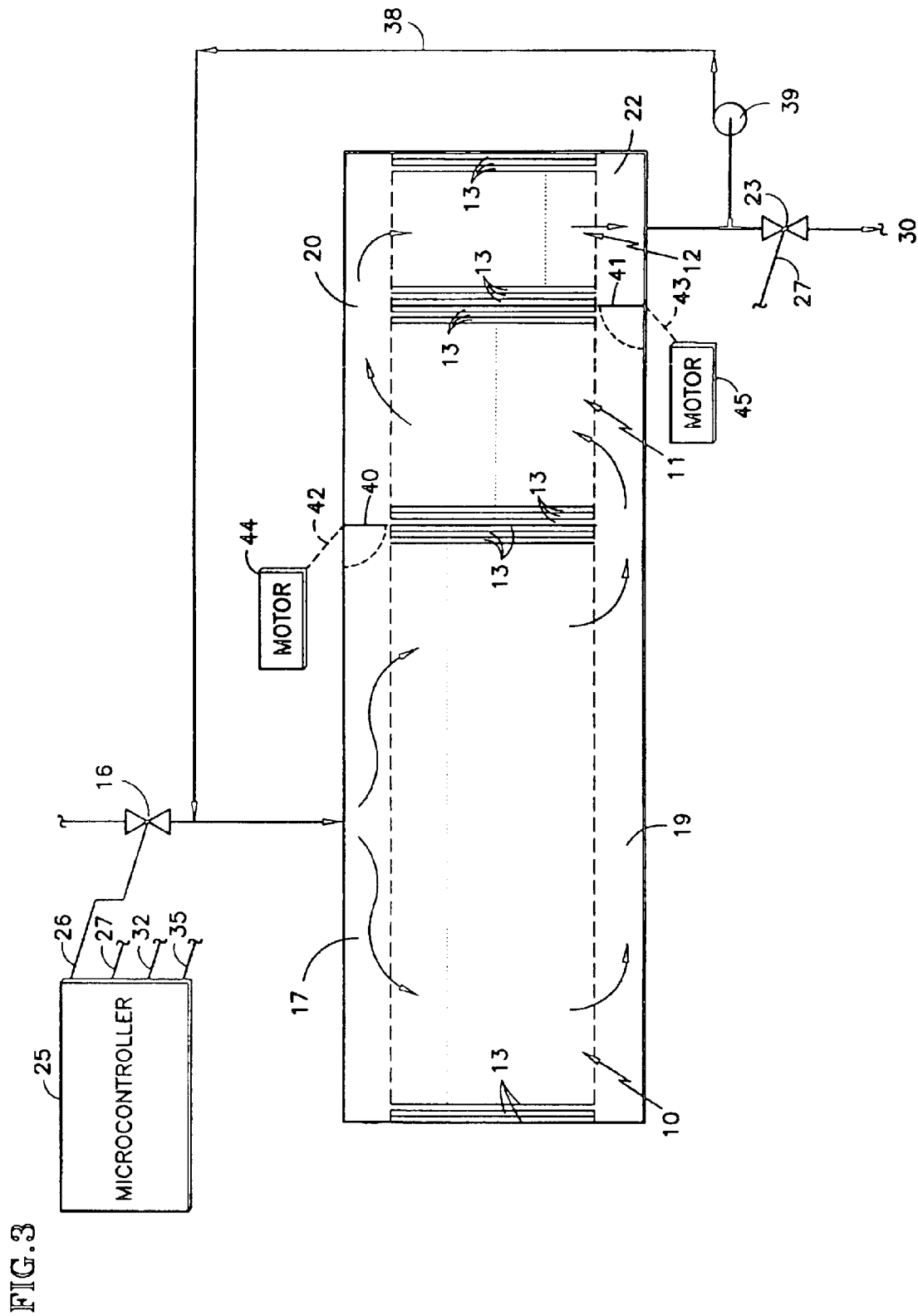
FIG. 3 is a schematic diagram of the fuel flow system of a fuel cell stack having a three-group cascade fuel flow field, with rotating external manifold gates adjusted for normal fuel cell operation.

A second embodiment of the invention is illustrated in FIG. 3. Therein, instead of purge fuel valves 33, 36, the embodiment of FIG. 3 employs rotatable manifold gates 40, 41 each of which is connected by suitable gearing 42, 43 to a corresponding motor 44, 45. With the gates 40, 41 as shown, which is the case during normal operation for the production of electricity, flow will be from the inlet manifold 17, through the first group 10, through the first turnaround manifold 19, through the second group 11, through the second turnaround manifold 20, through the third group 12 and the exit manifold 22 to the valve 23.

Figure 4:
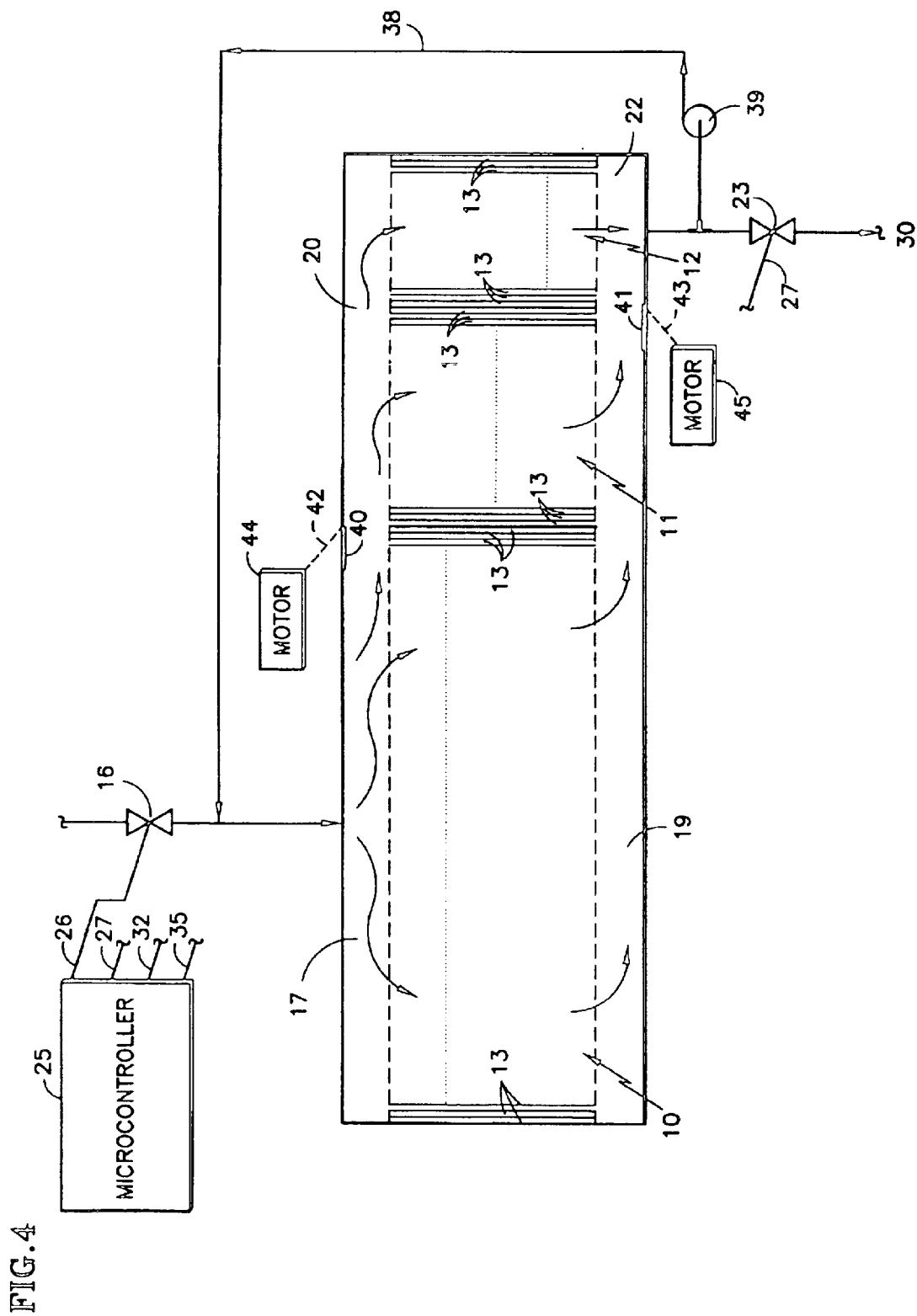
FIG. 4 is a schematic diagram of the fuel flow system of a fuel cell stack having a three-group cascade fuel flow field, with rotating external manifold gates adjusted for a rapid purge of the fuel flow fields, in accordance with the invention.

When the gates 40, 41 are open as illustrated in FIG. 4, as is the case during a purge, the fuel flows from the inlet manifold 17 through group 10 to the first turnaround manifold 19; from the inlet manifold 17 through the second turnaround manifold 20, through both group 11 and group 12, through a portion of the first turnaround manifold 19 and through the exit manifold 22 to the valve 23.

Figure 5:
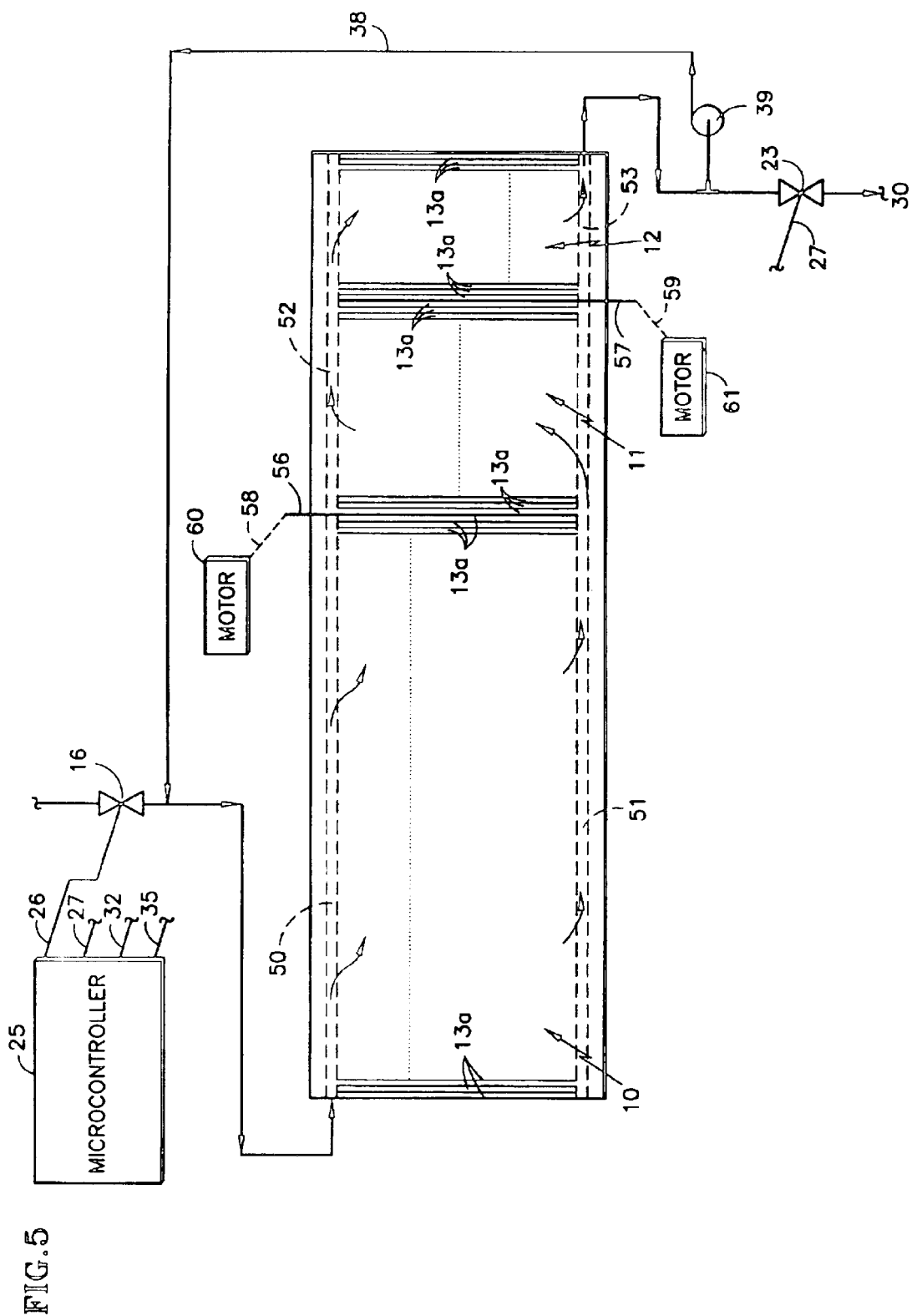
FIG. 5 is a schematic diagram of the fuel flow system of a fuel cell stack having a three-group cascade fuel flow field, with sliding internal manifold gates adjusted for normal fuel cell operation.

In the embodiment of the invention illustrated in FIG. 5, instead of having external manifolds 17, 19, 20, 22, the fuel cell stack has internal manifolds 50–53, which comprise ports extending through all of the fuel cells 13a in the stack. In accordance with the invention, sliding gates 56, 57 are driven inwardly or outwardly through suitable linkage 58, 59 by corresponding motors 60, 61. With the sliding gates closed as shown in FIG. 5, which is the case during normal operation for the production of electricity, the fuel flows from an inlet manifold 50, through the first group 10, through a first turnaround manifold 51, through the second group 11, through a second turnaround manifold 52, through the third group 12, and through an exit manifold 53 to the valve 23.

Figure 6:
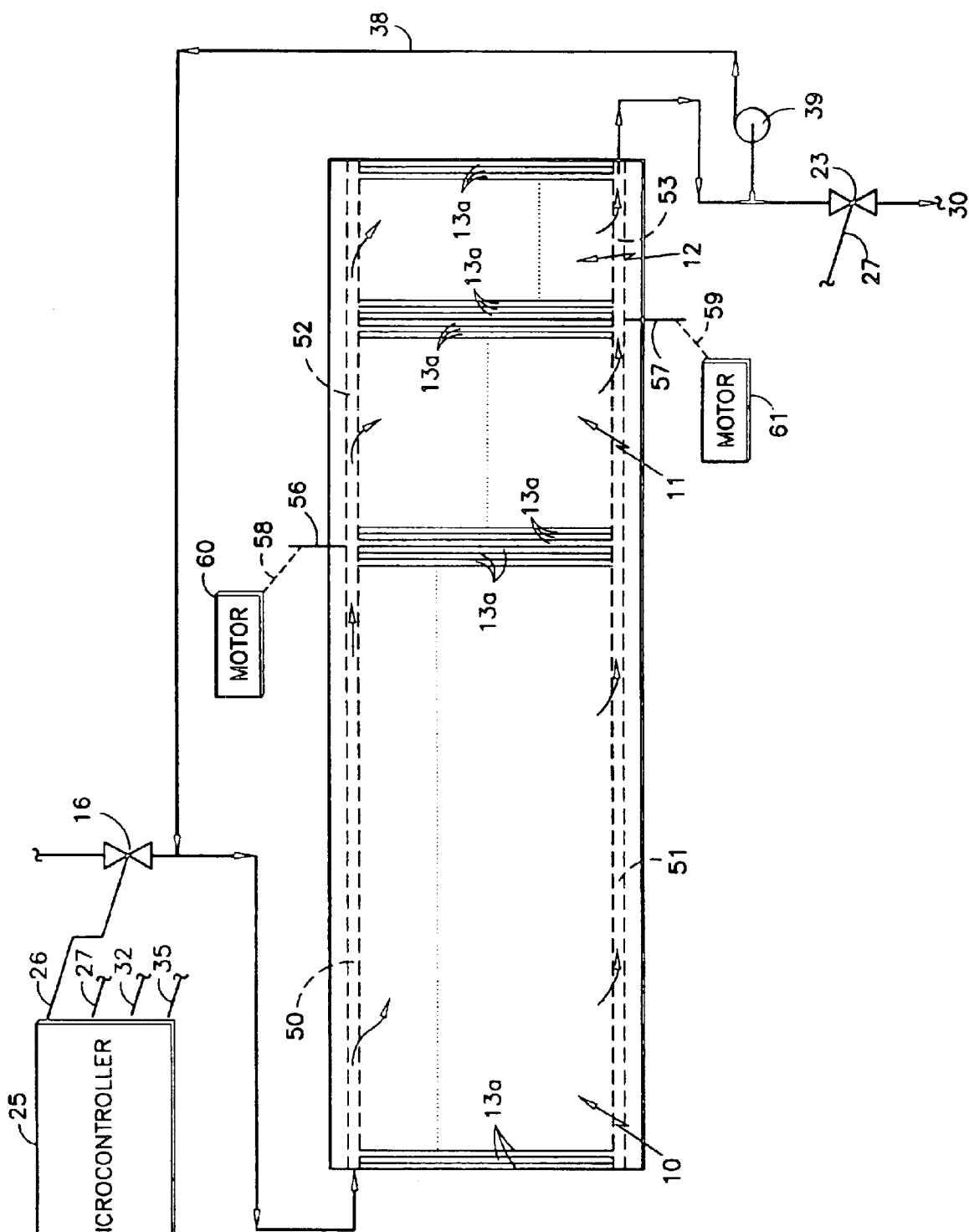
FIG. 6 is a schematic diagram of the fuel flow system of a fuel cell stack having a three-group cascade fuel flow field, with sliding internal manifold gates adjusted for a rapid purge of the fuel flow fields, in accordance with the invention.

In FIG. 6, when the sliding gates 56, 57 are open, as is the case during a purge, fuel flows along the inlet manifold 50 and first turnaround manifold 52 into all three groups 10, 11, 12 and then through the first turnaround manifold 51 and the exit manifold 53 to the valve 23.

The embodiments of FIGS. 4–6 may have a certain degree of fuel leakage, but such fuel leakage may be tolerable between the inlet manifold and the second turnaround manifold. Fuel leakage between the first turnaround manifold and the exit manifold may also be tolerable provided there is a recycle loop 38, to avoid wasting fuel.

Although shown for a cascade fuel flow field having three groups 10–12, the invention can obviously be used with a cascade fuel flow field having more groups of cells, simply by providing sufficient means so that, during a purge, each group receives fuel directly, rather than after flowing through another group, and the fuel from each group exhausts directly, rather than flowing through another group.

The aforementioned patent applications are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A fuel cell stack comprising:

a cascaded fuel flow field having at least a first group of fuel cells receiving fuel from a source, a second group of fuel cells normally receiving fuel from said first group, and a third group of fuel cells normally receiving fuel from said second group of fuel cells, and in which the number of fuel cells in each group exceeds the number of fuel cells in any group downstream thereof in said fuel flow field;

at least one fuel inlet means for inputting fuel settable in either of two conditions, operable in a first condition to cause fuel to flow directly from said source only into said first group of fuel cells, and operable in a second condition to cause fuel to flow directly from said source into each of said groups of fuel cells without such fuel first flowing through any other group of fuel cells;

at least one fuel outlet means for outputting fuel settable in either of two conditions, operable in a first condition to cause fuel to flow directly to exhaust only from a last group of said fuel cells, and operable in a second condition to cause fuel to flow from each of said groups of fuel cells directly to exhaust without such fuel first flowing through any other group of fuel cells; and fuel inlet and fuel exhaust manifolds, said fuel inlet means being within said fuel inlet manifold and said fuel outlet means being within said fuel exhaust manifold.

2. A fuel cell stack according to claim 1 wherein said fuel inlet means and said fuel outlet means are rotatable between said two conditions.

3. A fuel cell stack according to claim 2 wherein said fuel inlet and exhaust manifolds are external to said fuel cell stack.

4. A fuel cell stack according to claim 1 wherein said fuel inlet means and said fuel outlet means are slidable between said two conditions.

5. A fuel cell stack according to claim 4 wherein said fuel inlet manifold and said fuel exhaust manifold are internal of said fuel cell stack.

* * * * *